US012305752B2

(12) United States Patent
Budacs et al.

(10) Patent No.: US 12,305,752 B2
(45) Date of Patent: May 20, 2025

(54) TRANSMISSION

(71) Applicants: Ningbo Geely Automobile Research & Development Co., Ltd., Ningbo (CN); Zhejiang Geely Holding Group Co., Ltd., Zhejiang (CN)

(72) Inventors: Henrique Budacs, Gothenburg (SE); Eva Barrientos Blanco, Gothenburg (SE); Adil Shabbir, Hisings Backa (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 0 days.

(21) Appl. No.: 18/221,951

(22) Filed: Jul. 14, 2023

(65) Prior Publication Data

US 2023/0358308 A1 Nov. 9, 2023

Related U.S. Application Data

(63) Continuation of application No. PCT/CN2022/071754, filed on Jan. 13, 2022.

(30) Foreign Application Priority Data

Jan. 18, 2021 (EP) .................................. 21152060

(51) Int. Cl.
*F16H 63/32* (2006.01)
*F16H 63/16* (2006.01)

(52) U.S. Cl.
CPC ............ *F16H 63/32* (2013.01); *F16H 63/16* (2013.01)

(58) Field of Classification Search
CPC .... F16H 63/16; F16H 63/32; Y10T 74/19251; Y10T 74/19284; Y10T 74/20177; Y10T 74/20183
(Continued)

(56) References Cited

U.S. PATENT DOCUMENTS 6,811,010 B1 11/2004 Armstrong
2015/0252898 A1 9/2015 Wise, Jr.

FOREIGN PATENT DOCUMENTS

CN 203146794 U 8/2013
CN 103671903 A 3/2014
(Continued)

OTHER PUBLICATIONS

International Search Report from corresponding International Application No. PCT/CN2022/071754, mailed on Apr. 13, 2022, 2 pages.
(Continued)

*Primary Examiner* — T. Scott Fix
(74) *Attorney, Agent, or Firm* — Tucker Ellis LLP

(57) ABSTRACT

A transmission includes a shifting fork and has first and second states that are selectable with the shifting fork. The shifting fork deactivates and activates a first element of the transmission, where the first state is provided when the first transmission element is activated, and to deactivate and activate a second element of the transmission, where the second state of the transmission is provided when the second transmission element is activated. The shifting fork is displaceable in an axial direction between first and second predetermined positions, and when the shifting fork is placed in the first predetermined position, the first transmission element is activated providing the first state and the second transmission element is deactivated, and when the shifting fork is placed in the second predetermined position, the first transmission element is activated providing the first (Continued)

state and the second transmission element is activated providing the second state.

11 Claims, 8 Drawing Sheets

(58) Field of Classification Search
USPC ..................................................... 74/473.37
See application file for complete search history.

(56) References Cited

FOREIGN PATENT DOCUMENTS

| | | |
|---|---|---|
| CN | 205824119 U | 12/2016 |
| CN | 207131846 U | 3/2018 |
| DE | 10241743 A1 | 3/2004 |
| DE | 202016102495 U | 8/2017 |
| EP | 3530994 A1 | 8/2019 |
| FR | 2782768 A1 | 3/2000 |
| JP | 2016114196 A | 6/2016 |
| WO | 2014187457 A1 | 11/2014 |
| WO | 2015012656 A1 | 1/2015 |

OTHER PUBLICATIONS

Lesics, "Manual Transmission, How it works?", published on YouTube on Mar. 4, 2015, https://www.youtube.com/watch?v=wCu9W9xNwtI.

TRANSMISSION

RELATED APPLICATION DATA

This application is a continuation of International Patent Application No. PCT/CN2022/071754, filed Jan. 13, 2022, which claims the benefit of European Patent Application No. 21152060.6, filed Jan. 18, 2021, the disclosures of which are incorporated herein by reference in their entireties.

TECHNICAL FIELD

The invention relates to a transmission for a vehicle, which transmission comprises a shifting fork, where the transmission has a first state and a second state which are selectable by means of the shifting fork.

BACKGROUND

Transmissions usually have several shifting forks for controlling a plurality of transmission elements. One shifting fork is used for actuating transmission elements one at the time for activating a gear or a park lock mechanism.

For example, an idle gear wheel that is journaled on a shaft, can be rotationally locked to the shaft by means of a sleeve that is engaged with a hub, which hub is rotationally locked to the shaft. The sleeve is brought into engagement with a dog ring of the idle gear wheel by axial displacement of the sleeve. The sleeve is moved into engagement with the dog ring by means of a shifting fork.

The need of several shifting forks requires a lot of space and will increase the number of components which in turn contributes to the complexity of the transmission, both with respect to the mechanics and the software for controlling the components of the transmission.

SUMMARY

An objective of the invention is to provide a transmission which has a reduced complexity.

The objective is achieved by a transmission comprising a shifting fork, where the transmission has a first state and a second state which are selectable by means of the shifting fork, and the shifting fork is arranged to deactivate and activate a first element of the transmission, where the first state is provided when the first transmission element is activated, and to deactivate and activate a second element of the transmission, where the second state is provided when the second transmission element is activated, and where the shifting fork is displaceable in an axial direction between a first predetermined position and a second predetermined position, and when the shifting fork is placed in the first predetermined position, the first transmission element is activated providing the first state and the second transmission element is deactivated, and when the shifting fork is placed in the second predetermined position, the first transmission element is activated providing the first state and the second transmission element is activated providing the second state.

The invention is based on the insight that by such a transmission the number of components and the weight can be reduced. The first state and the second state can be selected at the same time. A reduced number of shifting forks and corresponding actuators for driving the shifting forks can be used for achieving the states of the transmission. In addition, the use of fewer shifting forks may require simplified software, since fewer parameters are to be considered.

The expression "state" of the transmission, such as the first state and the second state, provided by activation of a transmission element, is meant to comprise "gear state" where torque can be transmitted between transmission elements, such as by a pair of gear wheels engaged with each other, and "park lock state" where a shaft of the transmission is locked against rotation. In a "gear state", the gears activated can be arranged for achieving a gear or gear ratio of the transmission, or for enabling driving of an auxiliary equipment of the transmission, such as a pump or similar, or for connecting a driving unit of the transmission, such as an electric motor, to a shaft of the transmission.

Further, of course, the "states" have to be compatible to enable these to be provided at the same time.

According to one embodiment, the shifting fork is placeable in a further predetermined position providing a neutral of the transmission where the first transmission element is deactivated and the second transmission element is deactivated, where the shifting fork is displaceable in a first direction from the further predetermined position to the first predetermined position and further in the same first direction from the first predetermined position to the second predetermined position. Hereby, the first state and the second state can be achieved by relatively short movements of the shifting fork in one and the same direction from a neutral position.

According to a further embodiment, the shifting fork has a first fork portion for activation and deactivation of the first transmission element, and a second fork portion for activation and deactivation of the second transmission element. Hereby, the first transmission element and the second transmission element can be operated at the same time by moving the shifting fork in the axial direction.

According to a further embodiment, the transmission comprises a first shaft and a second shaft, where the first transmission element is arranged on the first shaft and the second transmission element is arranged on the second shaft.

For example, the first shaft and the second shaft can be arranged in line with each other and axially displaced relative to each other, where the first shaft can be a first input shaft and the second shaft can be a second input shaft. The transmission may comprise a first drive unit for driving the first input shaft and a second drive unit for driving the second input shaft.

Optionally, the first shaft and the second shaft are arranged in parallel to each other and radially displaced relative to each other, and the first shaft can be an input shaft and the second shaft can be an output shaft.

According to a further embodiment, the transmission comprises a first sleeve arranged on the first shaft and a second sleeve arranged on the second shaft, where the first fork portion is arranged for movement of the first sleeve for deactivation and activation of the first transmission element, and the second fork portion is arranged for movement of the second sleeve for deactivation and activation of the second transmission element, and preferably the transmission comprises a first hub arranged on the first shaft and a second hub arranged on the second shaft, where the first hub is rotationally locked to the first shaft and the second hub is rotationally locked to the second shaft, the first sleeve and the first hub are engageable and rotationally locked to each other when engaged, and the first sleeve and the first transmission element are engageable and rotationally locked to each other when engaged, the second sleeve and the second hub are engageable and rotationally locked to each other when engaged, and the second sleeve and the second transmission element are engageable and rotationally locked to each other when engaged. Hereby, a robust design for activation of the first transmission element and the second transmission element is achieved.

According to a further embodiment, the first transmission element is a first idle gear wheel arranged on the first shaft and the second transmission element is a second idle gear wheel arranged on the second shaft, where the first state is provided by that the first idle gear wheel is rotationally locked to the first shaft by means of the first sleeve, and the second state is provided by that the second idle gear wheel is rotationally locked to the second shaft by means of the second sleeve. Hereby, gears for providing gear ratios of the transmission or for driving auxiliary equipment can be achieved.

According to a further embodiment, the first transmission element has a first dog ring engageable with the first sleeve and the second transmission element has a second dog ring engageable with the second sleeve, where the first sleeve and the first dog ring have a first engagement length in the axial direction in the first predetermined position of the shifting fork and a second engagement length in the axial direction in the second predetermined position of the shifting fork, and the second sleeve and the second dog ring have an engagement length in the axial direction in the second predetermined position of the shifting fork which engagement length is substantially equal to the difference between the first engagement length and the second engagement length. Hereby, the shifting fork can be moved in the axial direction for activation of the first transmission element and further moved in the same direction for activation of the second transmission while the first transmission element is remaining activated.

According to a further embodiment, the transmission has a third state and a fourth state which are selectable by means of the shifting fork, where the shifting fork is arranged to deactivate and activate a third element of the transmission, where the third state is provided when the third transmission element is activated, and to deactivate and activate a fourth element of the transmission, where the fourth state is provided when the fourth transmission element is activated, and the shifting fork is displaceable in the axial direction between a third predetermined position and a fourth predetermined position, and when the shifting fork is placed in the third predetermined position, the third transmission element is activated providing the third state and the fourth transmission element is deactivated, and when the shifting fork is placed in the fourth predetermined position, the third transmission element is activated providing the third state and the fourth transmission element is activated providing the fourth state. Hereby, the number of components and the weight can be reduced for an increased state of the transmission. A reduced number of shifting forks and corresponding actuators for driving the shifting forks, can be used for achieving the states of the transmission. In addition, the use of fewer shifting forks may require simplified software, since fewer parameters are to be considered.

As it regards the interpretation of the expression "state" for the third state and the fourth state, reference is made to the description hereinabove for the first state and the second state. Further, of course, the third state and the fourth state have to be compatible to each other to be provided at the same time.

All states do not have to be compatible to be used at the same time. In the third predetermined position of the shifting fork, preferably the first transmission element is deactivated and the second transmission element is deactivated, and in the fourth predetermined position of the shifting fork, preferably the first transmission element is deactivated and the second transmission element is deactivated.

According to a further embodiment, the shifting fork is displaceable in a second direction opposite to the first direction from the further predetermined position to the third predetermined position and further in the same second direction from the third predetermined position to the fourth predetermined position. Hereby, the third state and the fourth state can be achieved by relatively short movements of the shifting fork in one and the same direction from a neutral position.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Figure 1:
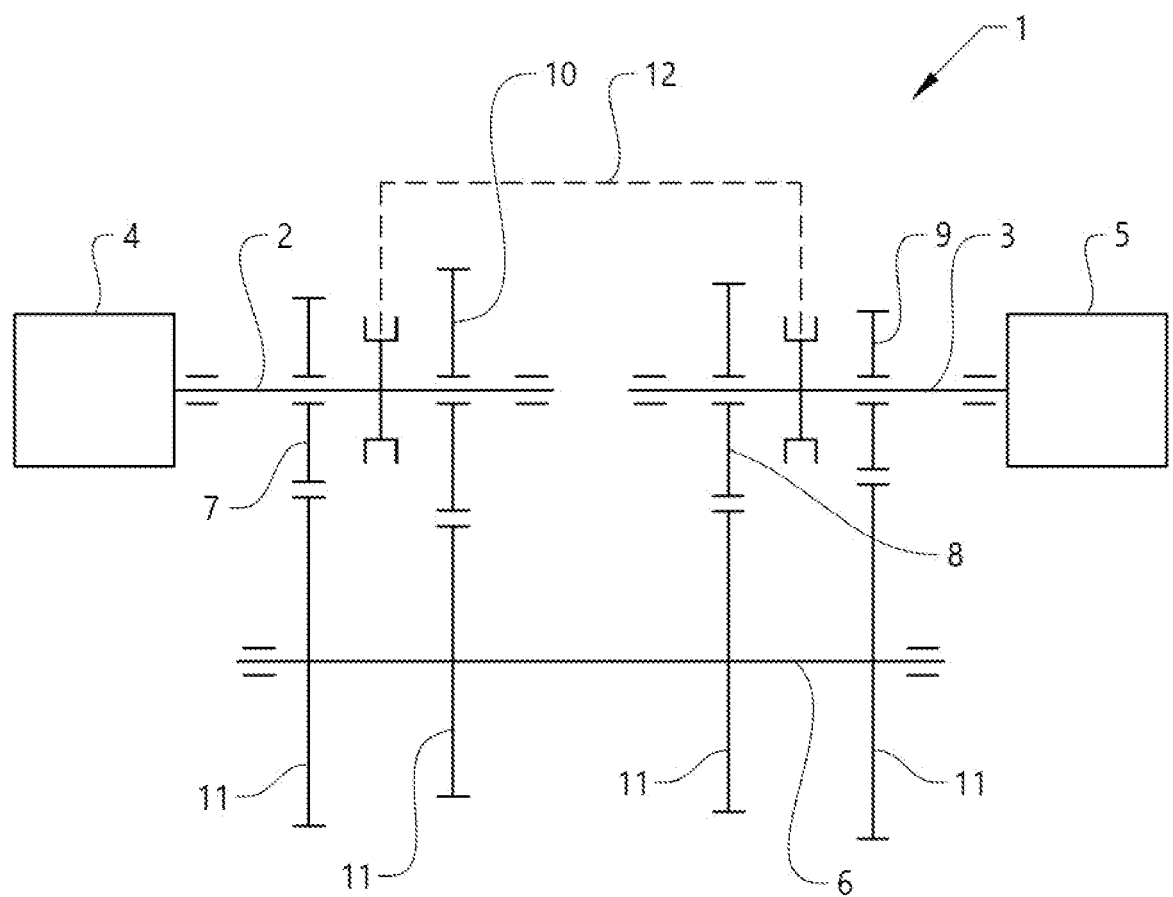
FIG. 1 is a schematic view of a transmission having two input shafts and an output shaft.

FIG. 1 is a schematic view of a transmission 1 for a vehicle. The transmission 1 comprises a first shaft 2 and a second shaft 3. The first shaft 2 can be a first input shaft driven by a first drive unit 4, and the second shaft 3 can be a second input shaft driven by a second drive unit 5. The first drive unit 4 and the second drive unit 5 can be electric motors, for instance, or one of the drive units may be another motor such as an internal combustion engine. The first shaft 2 and the second shaft 3 are suitably arranged in line with each other and axially displaced relative to each other. Further, the transmission 1 in FIG. 1 has a third shaft 6. The third shaft 6 can be an output shaft.

In the example embodiment illustrated in FIG. 1, the transmission 1 comprises four transmission elements 7, 8, 9, 10 that can be activated. The first transmission element 7 provides a first state of the transmission 1 when activated, the second transmission element 8 provides a second state of the transmission 1 when activated, the third transmission element 9 provides a third state of the transmission 1 when activated, and the fourth transmission element 10 provides a fourth state of the transmission 1 when activated. The transmission elements 7, 8, 9, 10 are idle gear wheels journaled on the first shaft 2 and the second shaft 3, which idle gear wheels are engaged with gear wheels 11 arranged on the third shaft 6. The idle gear wheels 7, 8, 9, 10 can be activated by movement of a shifting fork 12. In FIG. 1, the shifting fork 12 is schematically indicated by a dotted line. When activated the idle gear wheel is rotationally locked to the shaft. The gear wheels 11 arranged on the third shaft 6 are suitably permanently rotationally locked to the third shaft 6.

Thus when any of the transmission elements 7, 10 arranged on the first shaft 2 is activated, the first shaft 2 and the third shaft 6 are connected to each other for transferring torque from the first drive unit 4 and between the first shaft 2 and the third shaft 6, and when any of the transmission elements 8, 9 arranged on the second shaft 3 is activated, the second shaft 3 and the third shaft 6 are connected to each other for transferring torque from the second drive unit 5 and between the second shaft 3 and the third shaft 6.

Figure 2:
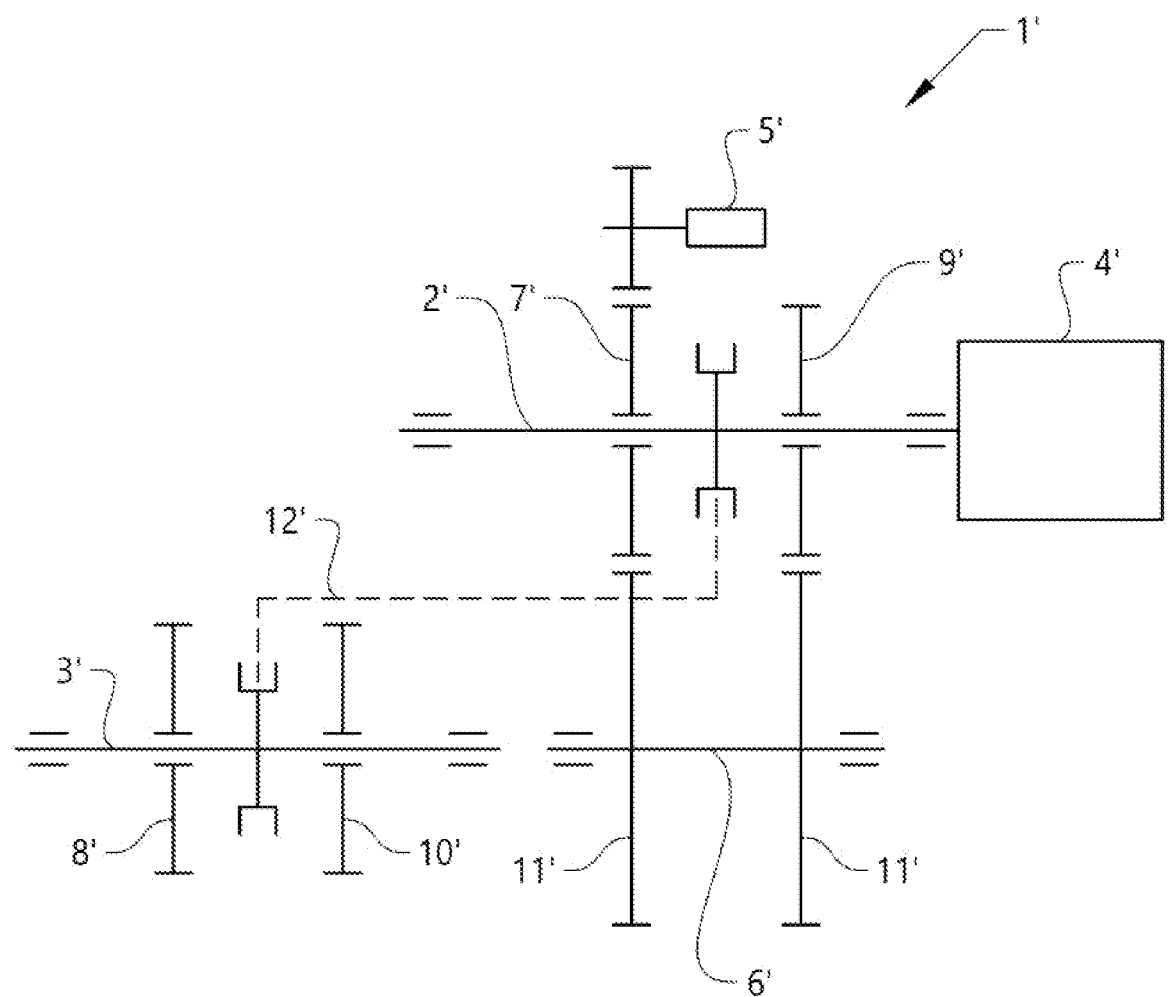
FIG. 2 is a schematic view of a transmission having an input shaft and two output shafts.

FIG. 2 is a schematic view of a further example embodiment of a transmission 1' for a vehicle. The transmission 1' comprises a first shaft 2', a second shaft 3' and a third shaft 6'. The first shaft 2' can be an input shaft driven by a first drive unit 4' and/or a second drive unit 5', and the second shaft 3' can be a first output shaft and the third shaft 6' can be a second output shaft. The first drive unit 4' and the second drive unit 5' can be electric motors, for instance, or one of the drive units may be another motor such as an internal combustion engine. The first shaft 2' and the second shaft 3' are suitably arranged in parallel to each other and radially displaced relative to each other.

In the example embodiment illustrated in FIG. 2, the transmission 1' comprises four transmission elements 7', 8', 9', 10' that can be activated. The first transmission element 7' provides a first state of the transmission 1' when activated, the second transmission element 8' provides a second state of the transmission 1' when activated, the third transmission element 9' provides a third state of the transmission 1' when activated, and the fourth transmission element 10' provides a fourth state of the transmission 1' when activated. The transmission elements 7', 8', 9', 10' are idle gear wheels journaled on the first shaft 2' and the second shaft 3'. The idle gear wheels 7', 9' arranged on the first shaft 2' are engaged with gear wheels 11' arranged on the third shaft 6'. The idle gear wheels 8', 10' arranged on the second shaft 3' are suitably engaged with corresponding gear wheels arranged on a further driven shaft (not shown). The idle gear wheels 7', 8', 9', 10' can be activated by movement of a shifting fork 12'. In FIG. 2, the shifting fork 12' is schematically indicated by a dotted line. When activated, the idle gear wheel is rotationally locked to the shaft. The gear wheels 11' arranged on the third shaft (and on the further shaft) are suitably permanently rotationally locked to the third shaft 6' (and to the further shaft).

Thus when any of the transmission elements 7', 9' arranged on the first shaft 2' is activated, the first shaft 2' and the third shaft 6' are connected to each other for transferring torque from the first drive unit 4' or the second drive unit 5' and between the first shaft 2' and the third shaft 6'. When any of the transmission elements 8', 10' arranged on the second shaft 3' is activated, torque can be transferred between the current transmission element and the corresponding gear wheel of the further driven shaft (not shown). Although the transmission elements 8', 10' arranged on the second shaft 3' are exemplified by idle gear wheels, in another embodiment such a transmission element can instead be a park lock mechanism for locking the second shaft. Further, in case gear wheels are arranged on the second shaft, these can be used for achieving a gear ratio of the transmission as well as for enabling driving of any auxiliary equipment such as a pump or for connecting a further drive unit to the transmission.

Figure 3A:
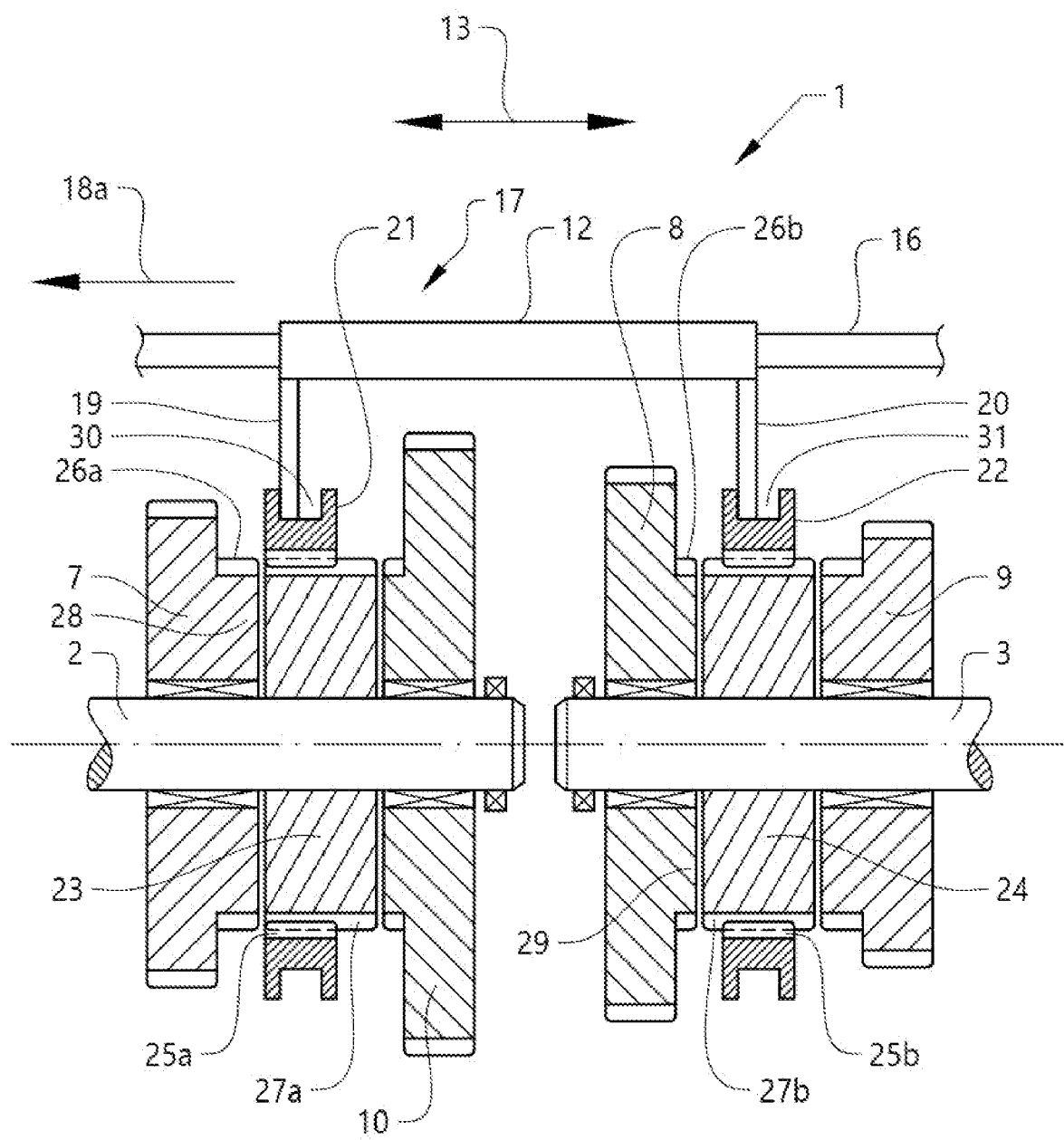
FIG. 3A shows the transmission illustrated in FIG. 1, where the transmission is in neutral before activation of a first transmission element.
Figure 3B:
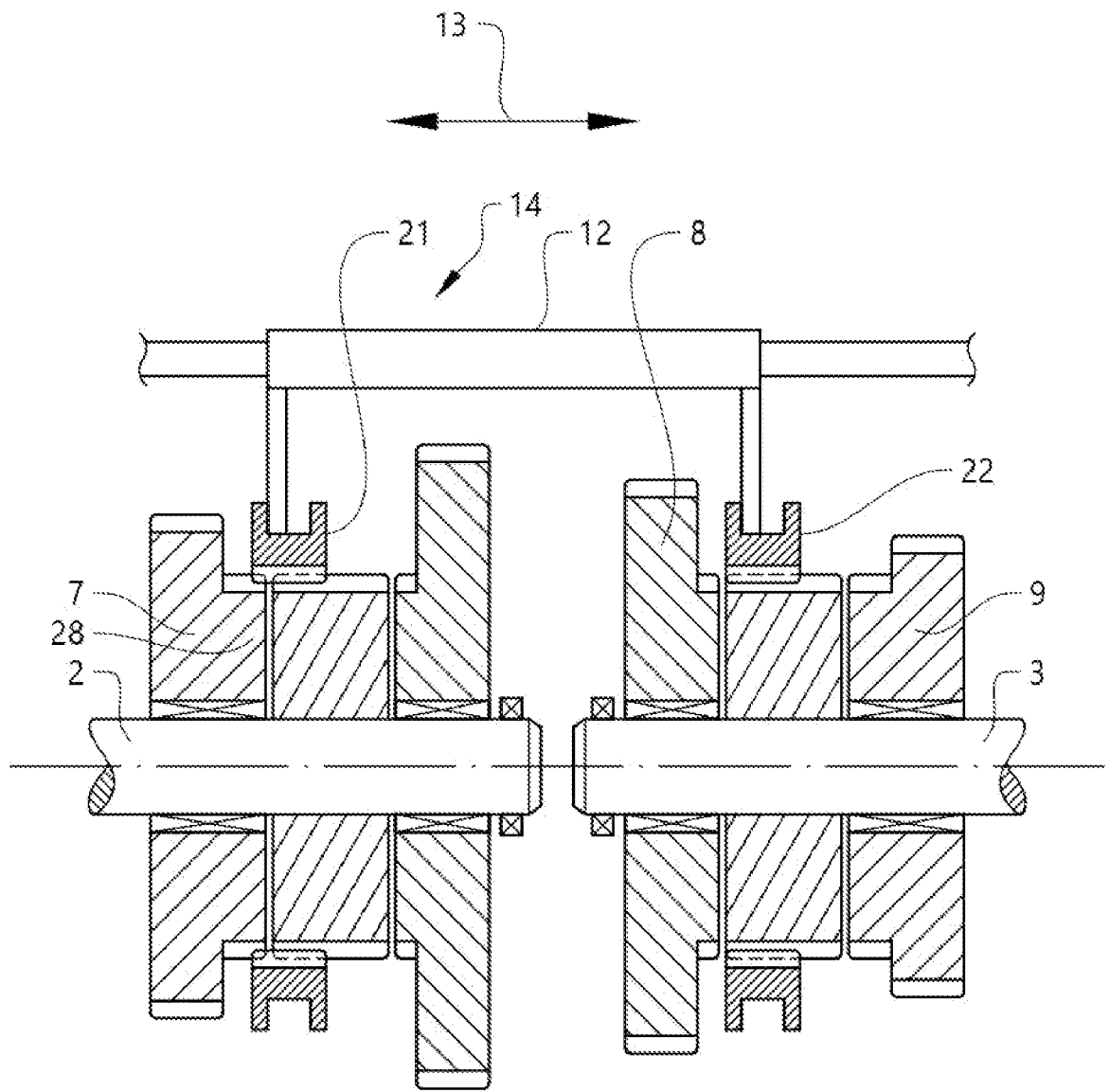
FIG. 3B shows the transmission of FIG. 3A when a first idle gear wheel is activated.
Figure 3C:
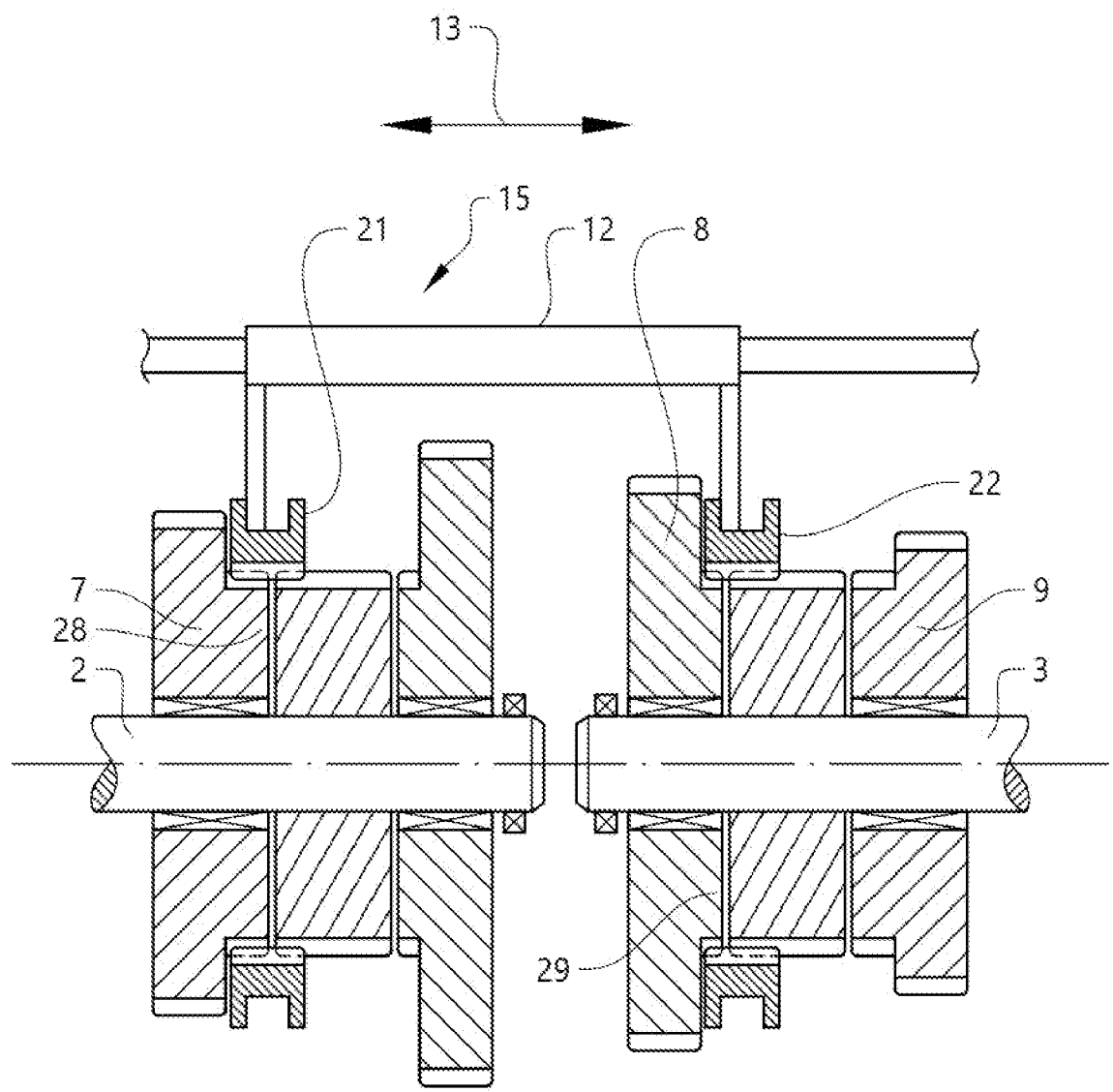
FIG. 3C shows the transmission of FIG. 3A when the first idle gear wheel and a second idle gear wheel are activated.
Figure 3D:
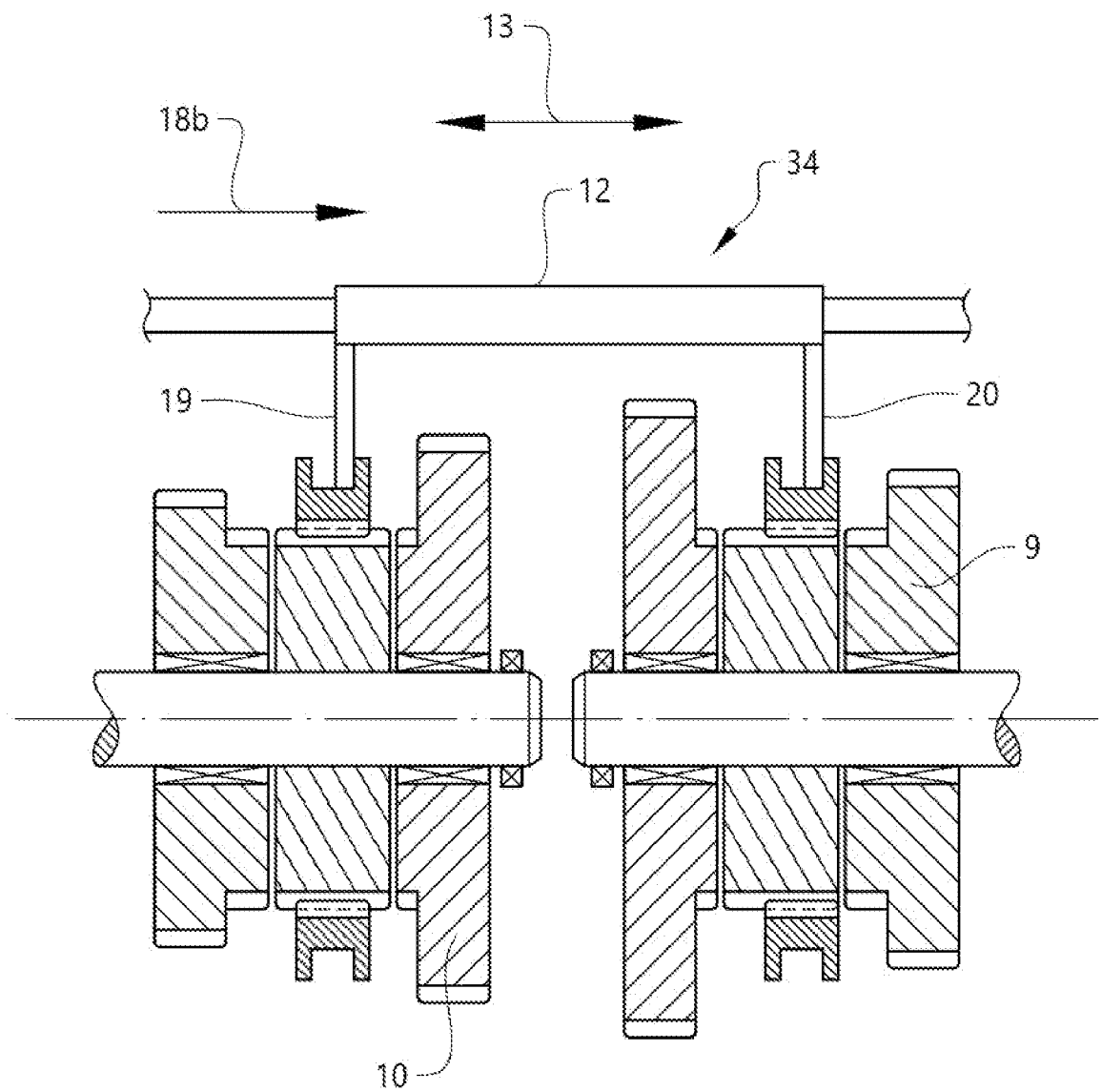
FIG. 3D shows the transmission of FIG. 1, where the transmission is in neutral before activation of a third transmission element.
Figure 3E:
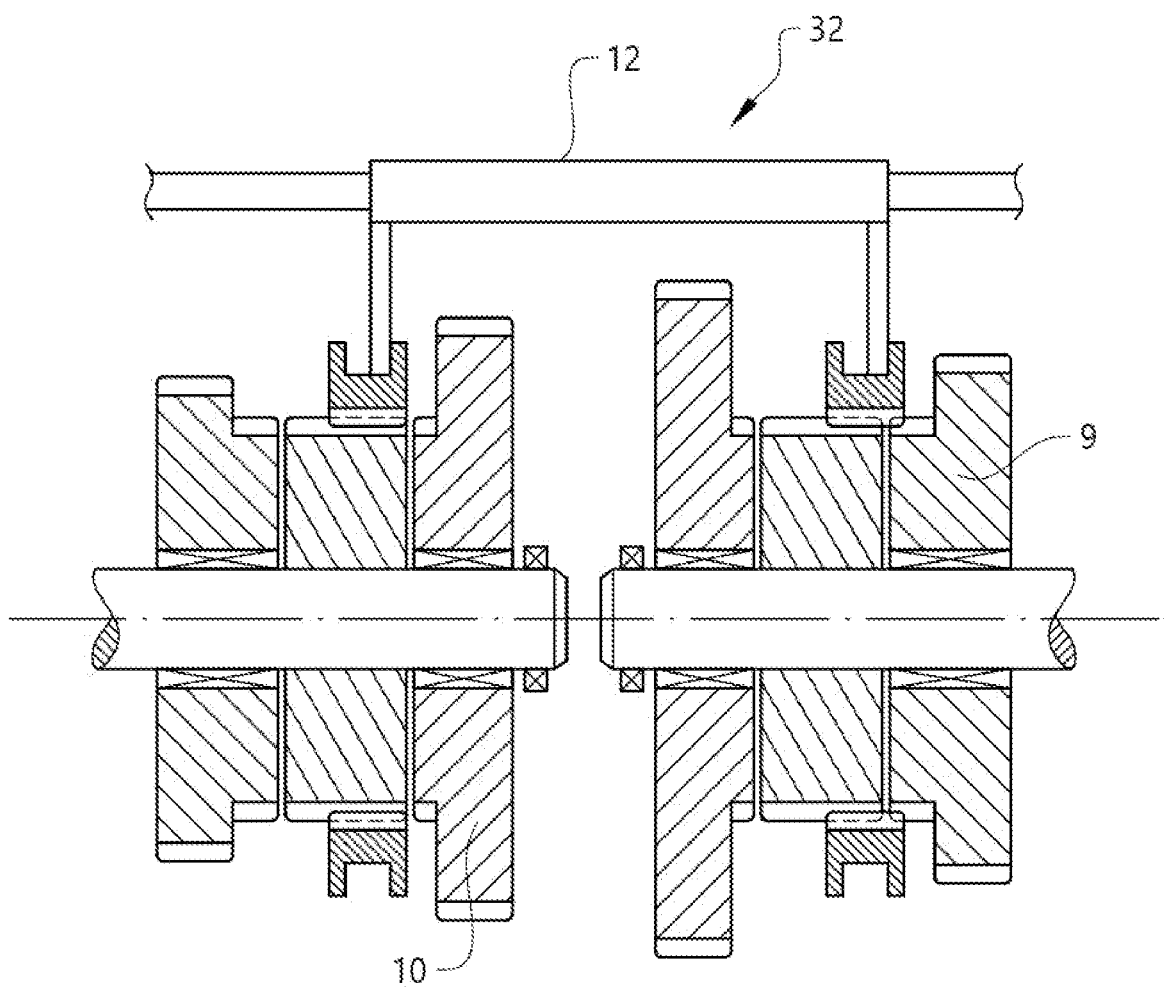
FIG. 3E shows the transmission of FIG. 3D when a third idle gear wheel is activated.
Figure 3F:
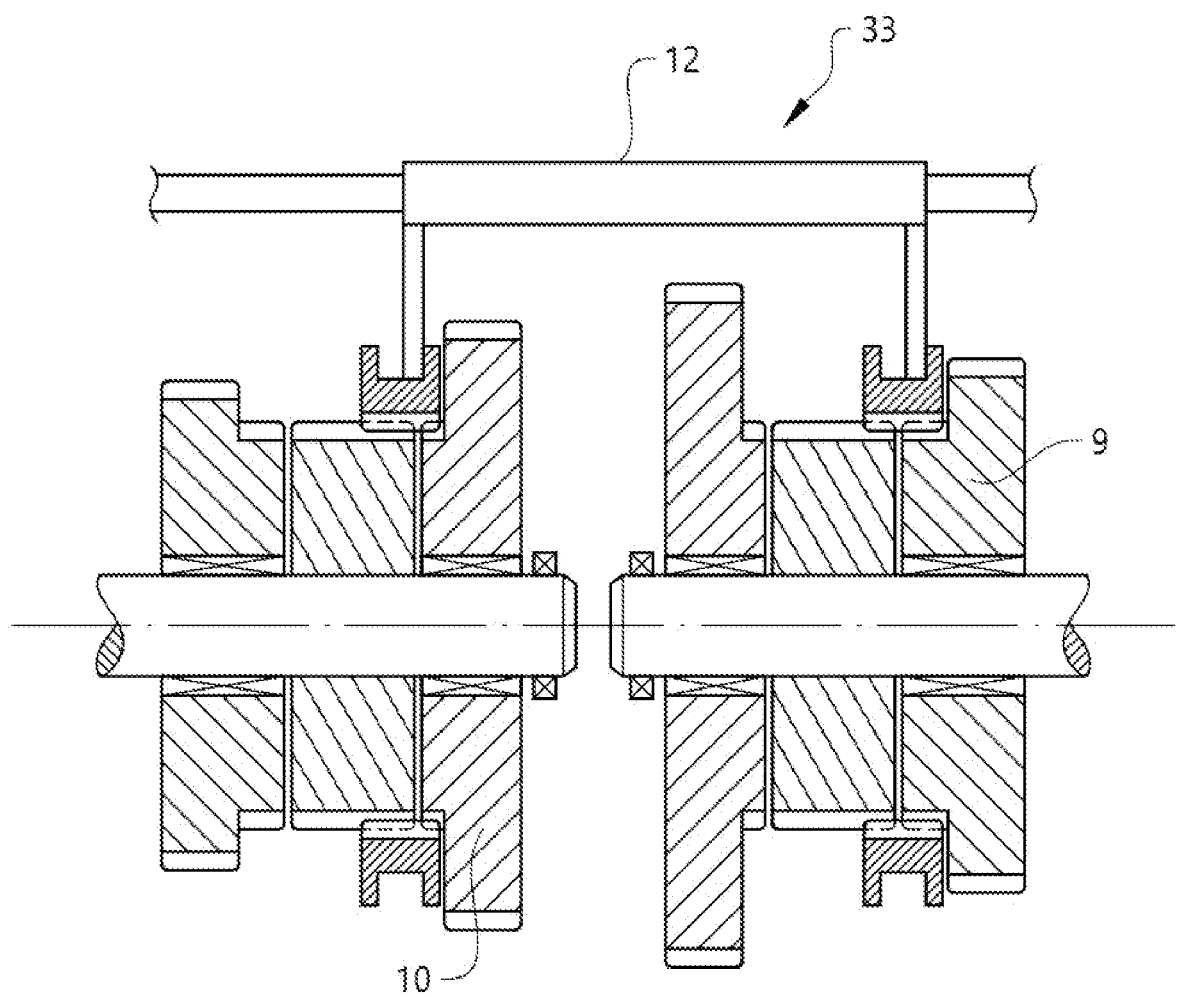
FIG. 3F shows the transmission of FIG. 3D when the third idle gear wheel and a fourth idle gear wheel are activated.

FIGS. 3A-3F shows the transmission 1 illustrated in FIG. 1 more in detail in cut views. FIGS. 3A-3C shows the activation of the first transmission element 7 and the second transmission element 8. FIGS. 3D-3F shows the activation of the third transmission element 9 and the fourth transmission element 10.

The transmission 1 comprises the shifting fork 12, and the first state and the second state of the transmission 1 are selectable by means of the shifting fork 12. The shifting fork 12 is arranged to deactivate the first transmission element 7 and activate the first transmission element 7 providing the first state, and to deactivate the second transmission element 8 and activate the second transmission element 8 providing the second state. The shifting fork 12 is displaceable in an axial direction 13 between a first predetermined position 14 and a second predetermined position 15. The shifting fork 12 can be arranged on a shifting fork shaft 16 and operated by any suitable actuator controlled by a control unit for positioning the shifting fork 12 in the selectable predetermined positions.

In FIG. 3A, the transmission 1 is in neutral before activation of the first transmission element 7. As is shown in FIG. 3B, when the shifting fork 12 is placed in the first predetermined position 14, the first transmission element 7 is activated providing the first state and the second transmission element 8 is deactivated. As is shown in FIG. 3C, when the shifting fork 12 is placed in the second predetermined position 15, the first transmission element 7 is activated providing the first state and the second transmission element 8 is activated providing the second state.

The shifting fork 12 can also be placeable in a further predetermined position 17 providing a neutral of the transmission 1 where the first transmission element 7 is deactivated and the second transmission element 8 is deactivated. The position of the shifting fork 12 as illustrated in FIG. 3A can be such a neutral of the transmission 1.

The shifting fork 12 is displaceable in a first direction 18a from the further predetermined position 17 to the first predetermined position 14 and further in the same first direction 18a from the first predetermined position 14 to the second predetermined position 15. The shifting fork 12 has a first fork portion 19 for deactivation and activation of the first transmission element 7, and a second fork portion 20 for deactivation and activation of the second transmission element 8. The first fork portion 19 and the second fork portion 20 are arranged on the shifting fork 12 at a fixed distance from each other, such that a movement of the shifting fork 12 creates the same movement of the first fork portion 19 and the second fork portion 20.

The transmission 1 comprises a first sleeve 21 arranged on the first shaft 2 and a second sleeve 22 arranged on the second shaft 3. The first fork portion 19 of the shifting fork 12 is arranged for movement of the first sleeve 21 for deactivation and activation of the first transmission element 7, and the second fork portion 20 is arranged for movement of the second sleeve 22 for deactivation and activation of the second transmission element 8.

The transmission 1 suitably comprises a first hub 23 arranged on the first shaft 2 and a second hub 24 arranged on the second shaft 3. The first hub 23 is rotationally locked to the first shaft 2 and the second hub 24 is rotationally locked to the second shaft 3. The first sleeve 21 and the first hub 23 are engageable and rotationally locked to each other when engaged, and the first sleeve 21 and the first transmission element 7 are engageable and rotationally locked to each other when engaged. The second sleeve 22 and the second hub 24 are engageable and rotationally locked to each other when engaged, and the second sleeve 22 and the second transmission element 8 are engageable and rotationally locked to each other when engaged. In the embodiment illustrated in FIGS. 3A-3F, the first sleeve 21 and the first hub 23 are always engaged, and the second sleeve 22 and the second hub 24 are always engaged.

As previously described, the first transmission element is a first idle gear wheel 7 arranged on the first shaft 2 and the second transmission element is a second idle gear wheel 8 arranged on the second shaft 3. The first state of the transmission 1 is provided by that the first idle gear wheel 7 is rotationally locked to the first shaft 2 by means of the first sleeve 21, and the second state of the transmission 1 is provided by that the second idle gear wheel 8 is rotationally locked to the second shaft 3 by means of the second sleeve 22. In FIG. 3B, the first idle gear wheel 7 is activated, i.e. locked to the first shaft 2 via the first sleeve 21. In FIG. 3C, the first idle gear wheel 7 is activated, i.e. locked to the first shaft 2 via the first sleeve 21, and the second idle gear wheel 8 is activated, i.e. locked to the second shaft 3 via the second sleeve 22.

The first sleeve 21 and the second sleeve 22 can have splines 25a, 25b arranged on an internal surface of the sleeve for engagement with splines 26a, 26b of the first transmission element 7 and the second transmission element 8, respectively, which splines 26a, 26b are arranged on an external surface of the transmission element. Further, the splines 25a, 25b of the first sleeve and the second sleeve are suitably arranged for engagement with splines 27a, 27b of the first hub 23 and the second hub 24, respectively, which splines 27a, 27b are arranged on an external surface of the hub.

In other words; the first sleeve 21 and the second sleeve 22 are moveable in the axial direction 13 by means of the shifting fork 12 for engagement and disengagement relative to the first transmission element 7 and the second transmission element 8, respectively.

The first transmission element 7 has a first dog ring 28 engageable with the first sleeve 21 and the second transmission element 8 has a second dog ring 29 engageable with the second sleeve 22. The splines 26a of the first transmission element 7 are arranged on the first dog ring 28 and the splines 26b of the second transmission element 8 are arranged on the second dog ring 29. The first sleeve 21 and the first dog ring 28 have a first engagement length in the axial direction 13 in the first predetermined position 14 of the shifting fork 12. See FIG. 3B, where the first sleeve 21 encloses a part of the first dog ring 28. The first sleeve 21 and the first dog ring 28 have a second engagement length in the axial direction 13 in the second predetermined position 15 of the shifting fork 12. See FIG. 3C, where the engagement length is longer than in FIG. 3B and the first sleeve 21 encloses substantially the entire first dog ring 28.

The second sleeve 22 and the second dog ring 29 have an engagement length in the axial direction 13 in the second predetermined position 15 of the shifting fork which engagement length is substantially equal to the difference between the first engagement length and the second engagement length of the first sleeve 21 and the first dog ring 28. See FIG. 3C.

The splines do not need to be arranged along the entire current engagement length, though this may be advantageous due to increased strength.

In the embodiment illustrated in FIGS. 3A-3F, in addition to adapted dog ring lengths in the axial direction, the distance between the first fork portion 19 and the second fork portion 20 of the shifting fork 12 in the axial direction 13 can be adapted to enable the selectable predetermined positions to be reached. Particularly, the distance between the first fork portion 19 and the second fork portion 20 is suitably greater than the distance between the first hub 23 and the second hub 24 in the axial direction 13. Further, the length of the first hub 23 and the length of the second hub 24 are suitably greater than the length of the first sleeve 21 and the length of the second sleeve 22, respectively, in the axial direction 13.

In addition, the first sleeve 21 can have a groove 30 receiving the first fork portion 19, which groove 30 has a length in the axial direction 13 that exceeds the extension of the first fork portion 19 in the axial direction 13, and the second sleeve 22 can have a groove 31 receiving the second fork position 20, which groove 31 has a length in the axial direction 13 that exceeds the extension of the second fork portion 20 in the axial direction 13.

Optionally, in another embodiment, no further predetermined position for a neutral as described hereinabove is selectable by the shifting fork. This will however not exclude that an intermediate "state" where the transmission is in neutral, takes place temporarily during the movement of the shifting fork between two selectable predetermined positions.

FIGS. 3D-3F shows the activation of the third transmission element 9 and the fourth transmission element 10 of the transmission 1. The third state and the fourth state are selectable by means of the shifting fork 12. The shifting fork 12 is arranged to deactivate and activate the third transmission element 9, where the third state of the transmission 1 is provided when the third transmission element 9 is activated, and arranged to deactivate and activate the fourth transmission element 10, where the fourth state of the transmission 1 is provided when the fourth transmission element 10 is activated. The shifting fork 12 is displaceable in the axial direction 13 between a third predetermined position 32 and a fourth predetermined position 33, and when the shifting fork 12 is placed in the third predetermined position 32, the third transmission element 9 is activated providing the third state and the fourth transmission element 10 is deactivated, and when the shifting fork 12 is placed in the fourth predetermined position 33, the third transmission element 9 is activated providing the third state and the fourth transmission element 10 is activated providing the fourth state.

In FIG. 3D, the transmission is in neutral before activation of a third transmission element 9. As is shown in FIG. 3E, when the shifting fork 12 is placed in the third predetermined position 32, the third transmission element 9 is activated providing the third state and the fourth transmission element 10 is deactivated. As is shown in FIG. 3F, when the shifting fork 12 is placed in the fourth predetermined position 33, the third transmission element 9 is activated providing the third state and the fourth transmission element 10 is activated providing the fourth state.

The shifting fork 12 can also be placeable in a further predetermined position 34 providing a neutral of the transmission where the third transmission element 9 is deactivated and the fourth transmission element 10 is deactivated. The position of the shifting fork 12 as illustrated in FIG. 3D, can be such a neutral of the transmission 1.

The shifting fork 12 is displaceable in a second direction 18b opposite to the first direction 18a from the further predetermined position 34 to the third predetermined position 32 and further in the same second direction 18b from the third predetermined position 32 to the fourth predetermined position 33. The second fork portion 20 of the shifting fork 12 is arranged for deactivation and activation of the third transmission element 9, and the first fork portion 19 of the shifting fork 12 is arranged for deactivation and activation of the fourth transmission element 10.

Optionally, one or two further predetermined positions 17, 34 for a neutral of the transmission, as described hereinabove, can be selectable by the shifting fork 12. For example, a neutral can be achieved in a selectable position of the shifting fork 12 corresponding to the position 17 illustrated in FIG. 3A and/or a neutral can be achieved in a selectable position of the shifting fork 12 corresponding to the position 34 illustrated in FIG. 3D. Optionally, in another embodiment, no further predetermined position for a neutral as described hereinabove is selectable by the shifting fork. In such a case, this will however not exclude that an intermediate "state" where the transmission is in neutral, takes place temporarily during the movement of the shifting fork between two selectable predetermined positions, such as movement between the first predetermined position 14 and the third predetermined position 32 of the shifting fork 12.

As it regards further details of the components for implementing the third state and the fourth state of the transmission 1, reference is made to the description related to the first state and the second state of the transmission 1, since the components for implementing the third state and the fourth state can be substantially the same and constitute a mirror-inverted design of the design of the components for implementing the first state and the second state.

The embodiment illustrated in FIG. 2 can be achieved in the same way as described for the embodiment illustrated in FIG. 1. The first idle gear wheel 7', the second idle gear wheel 8', the third idle gear wheel 9' and the fourth idle gear wheel 10', of the embodiment in FIG. 2, can be designed with dog rings as the first idle gear wheel 7, the second idle gear wheel 8, the third idle gear wheel 9 and the fourth idle gear wheel 10, respectively, of the embodiment in FIG. 1.

It is to be understood that the present invention is not limited to the embodiments described above and illustrated in the drawings; rather, the skilled person will recognize that many changes and modifications may be made within the scope of the appended claims.

What is claimed is:

1. A transmission comprising a shifting fork, the transmission having a first state and a second state being selectable by means of the shifting fork, the shifting fork being arranged to deactivate and activate a first element of the transmission, the first state of the transmission being provided when the first transmission element is activated, and to deactivate and activate a second element of the transmission, the second state of the transmission being provided when the second transmission element is activated, the shifting fork being displaceable in an axial direction between a first predetermined position and a second predetermined position, and when the shifting fork being placed in the first predetermined position, the first transmission element is activated providing the first state and the second transmission element is deactivated, wherein when the shifting fork is placed in the second predetermined position, the first transmission element is activated providing the first state and the second transmission element is activated providing the second state, wherein the shifting fork has a first fork portion for deactivation and activation of the first transmission element, and a second fork portion for deactivation and activation of the second transmission element, and the transmission comprises a first shaft and a second shaft, the first transmission element being arranged on the first shaft and the second transmission element being arranged on the second shaft, wherein the transmission comprises a first sleeve arranged on the first shaft and a second sleeve arranged on the second shaft, the first fork portion being arranged for movement of the first sleeve for deactivation and activation of the first transmission element, and the second fork portion being arranged for movement of the second sleeve for deactivation and activation of the second transmission element, and wherein the first transmission element is a first idle gear wheel arranged on the first shaft and the second transmission element is a second idle gear wheel arranged on the second shaft, the first state being provided by that the first idle gear wheel is rotationally locked to the first shaft by means of the first sleeve, and the second state being provided by that the second idle gear wheel is rotationally locked to the second shaft by means of the second sleeve.

2. A transmission according to claim 1, wherein the shifting fork is placeable in a further predetermined position providing a neutral of the transmission where the first transmission element is deactivated and the second transmission element is deactivated, the shifting fork being displaceable in a first direction from the further predetermined position to the first predetermined position and further in the same first direction from the first predetermined position to the second predetermined position.

3. A transmission according to claim 1, wherein the transmission comprises a first hub arranged on the first shaft and a second hub arranged on the second shaft, the first hub being rotationally locked to the first shaft and the second hub being rotationally locked to the second shaft, the first sleeve and the first hub being engageable and rotationally locked to each other when engaged, and the first sleeve and the first transmission element being engageable and rotationally locked to each other when engaged, the second sleeve and the second hub being engageable and rotationally locked to each other when engaged, and the second sleeve and the second transmission element being engageable and rotationally locked to each other when engaged.

4. A transmission according to claim 1, wherein the first transmission element has a first dog ring engageable with the first sleeve and the second transmission element has a second dog ring engageable with the second sleeve, the first sleeve and the first dog ring having a first engagement length in the axial direction in the first predetermined position of the shifting fork and a second engagement length in the axial direction in the second predetermined position of the shifting fork, the second sleeve and the second dog ring having an engagement length in the axial direction in the second predetermined position of the shifting fork which engagement length is substantially equal to the difference between the first engagement length and the second engagement length.

5. A transmission according to claim 1, wherein the first state and/or the second state is a gear state.

6. A transmission according to claim 1, wherein the transmission has a third state and a fourth state which are selectable by means of the shifting fork, the shifting fork being arranged to deactivate and activate a third element of the transmission, the third state of the transmission being provided when the third transmission element is activated, and to deactivate and activate a fourth element of the transmission, the fourth state of the transmission being provided when the fourth transmission element is activated, the shifting fork being displaceable in the axial direction between a third predetermined position and a fourth predetermined position, and when the shifting fork being placed in the third predetermined position, the third transmission element is activated providing the third state and the fourth transmission element is deactivated, and when the shifting fork being placed in the fourth predetermined position, the third transmission element is activated providing the third state and the fourth transmission element is activated providing the fourth state.

7. A transmission according to claim 6, wherein the shifting fork is placeable in a further predetermined position providing a neutral of the transmission where the first transmission element is deactivated and the second transmission element is deactivated, the shifting fork being displaceable in a first direction from the further predetermined position to the first predetermined position and further in the same first direction from the first predetermined position to the second predetermined position wherein the shifting fork is displaceable in a second direction opposite to the first direction from the further predetermined position to the third predetermined position and further in the same second direction from the third predetermined position to the fourth predetermined position.

8. A transmission according to claim 1, wherein the first shaft and the second shaft are arranged in line with each other and axially displaced relative to each other.

9. A transmission according to claim 1, wherein the first shaft and the second shaft are arranged in parallel to each other and radially displaced relative to each other.

10. A transmission according to claim 6, wherein in the third predetermined position of the shifting fork, the first transmission element is deactivated and the second transmission element is deactivated.

11. A transmission according to claim 6, wherein in the fourth predetermined position of the shifting fork, the first transmission element is deactivated and the second transmission element is deactivated.

* * * * *